US010268435B2

(12) United States Patent
Terao (10) Patent No.: US 10,268,435 B2
(45) Date of Patent: *Apr. 23, 2019

(54) DISPLAY DEVICE, MULTI-DISPLAY SYSTEM, AND ID DETERMINATION METHOD FOR DISPLAY DEVICE

(71) Applicant: NEC Display Solutions, Ltd., Tokyo (JP)

(72) Inventor: Masayuki Terao, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/039,878

(22) Filed: Jul. 19, 2018

(65) Prior Publication Data

US 2018/0321893 A1 Nov. 8, 2018

Related U.S. Application Data

(63) Continuation of application No. 15/124,637, filed as application No. PCT/JP2014/056635 on Mar. 13, 2014, now Pat. No. 10,055,188.

(51) Int. Cl.
*G06F 3/14* (2006.01)
*G09G 5/00* (2006.01)

(52) U.S. Cl.
CPC .......... *G06F 3/1438* (2013.01); *G06F 3/1446* (2013.01); *G09G 5/006* (2013.01);
(Continued)

(58) Field of Classification Search
None
See application file for complete search history.

(56) References Cited

U.S. PATENT DOCUMENTS 10,055,188 B2 * 8/2018 Terao .................... G06F 3/1438
345/2.1
2006/0117007 A1 * 6/2006 Tsujimura .............. H04N 7/163
(Continued)

FOREIGN PATENT DOCUMENTS

JP 2000-020042 A 1/2000
JP 2000-276099 A 10/2000
(Continued)

OTHER PUBLICATIONS

United States Notice of Allowance dated Apr. 19, 2018 in U.S. Appl. No. 15/124,637.
(Continued)

*Primary Examiner* — Kenneth B Lee, Jr.
(74) *Attorney, Agent, or Firm* — McGinn I.P. Law Group, PLLC.

(57) ABSTRACT

A display device includes a network unit including a first port that is connectable to a control computer or a display device on a prior stage in a daisy chain manner and a second port that is connectable to a display device on a subsequent stage in the daisy chain manner, and a storage unit that stores addresses of display devices, as transmission sources, transmitted from one or each of the display devices at subsequent stages of a daisy chain connected via the second port in response to a request to search for a plurality of display devices as targets for determining display device IDs thereof the plurality of display devices being connected to the control computer in the daisy chain manner, the request being transmitted from the control computer to the plurality of display devices, where the addresses are received by the network unit.

20 Claims, 9 Drawing Sheets

(52) U.S. Cl.
CPC ... *G09G 2300/026* (2013.01); *G09G 2356/00* (2013.01); *G09G 2370/025* (2013.01); *G09G 2370/042* (2013.01); *G09G 2370/14* (2013.01)

(56) References Cited

U.S. PATENT DOCUMENTS

| | | | |
|---|---|---|---|
| 2008/0284675 A1 | 11/2008 | Perkins et al. | |
| 2013/0061271 A1* | 3/2013 | Lu ..................... | H04L 12/2838 |
| | | | 725/74 |

FOREIGN PATENT DOCUMENTS

| | | | |
|---|---|---|---|
| JP | 2002-207247 A | 7/2002 | |
| JP | 2005-202306 A | 7/2005 | |
| JP | 2006-180279 A | 7/2006 | |
| JP | 2012-113205 A | 6/2012 | |
| JP | 2012-124759 A | 6/2012 | |
| JP | 2013-011787 A | 1/2013 | |
| JP | 2014-230097 A | 12/2014 | |
| WO | WO 2014/064824 A1 | 5/2014 | |

OTHER PUBLICATIONS

United States Office Action dated Oct. 3, 2017 in U.S. Appl. No. 15/124,637.
International Search Report (ISR) (PCT Form PCT/ISR/210), in PCT/JP2014/056635, dated Jun. 10, 2014.
Japanese Office Action dated Jun. 13, 2017 in Japanese Application No. 2016-507197 with a partial English translation thereof.

* cited by examiner

FIG. 9 ically determining display IDs in order of arranging
DISPLAY DEVICE, MULTI-DISPLAY SYSTEM, AND ID DETERMINATION METHOD FOR DISPLAY DEVICE The present application is a Continuation Application of U.S. patent application Ser. No. 15/124,637, filed on Sep. 8, 2016, which is based on and claims priority from International Application No. PCT/JP2014/056635, filed on Mar. 13, 2014, the entire contents of which are incorporated herein by reference.

TECHNICAL FIELD

The present invention relates to a display device, a multi-display system, and an ID determination method for display devices.

BACKGROUND ART

A multi-configured display is known, which has a large screen as a whole by arranging and connecting a plurality of displays (see, for example, Patent Document 1). For the multi-configured display, various ideas for efficiently and automatically determining display IDs in order of arranging the displays so as to perform control via a network or by using a remote controller.

In recent years, the base of the connection has been changed from RS232C to the Ethernet (registered trademark).

Regarding such a change from RS232C to the Ethernet (registered trademark), RS232C defines a connecter to connect with the prior stage and a connecter to connect with the subsequent stage. Therefore, in a possible method of determining display IDs, interfaces for the subsequent stages of all connected displays are closed first, and then the display IDs are counted up while opening the interfaces for the subsequent stages one by one from the first stage.

However, in the above automatic determination method, when the number of the connected display devices as targets increases, time required for the determination also increases.

PRIOR ART DOCUMENT

Patent Document

Patent Document 1: Japanese Unexamined Patent Application, First Publication No. 2005-202306.

DISCLOSURE OF INVENTION

Problem to be Solved by the Invention

A problem to be solved is an increase in time required to determine display IDs when the number of the connected display devices increases.

Means for Solving the Problem

One mode of the present invention includes a network unit whose first port is connectable to a control computer or a display device on a prior stage in a daisy chain manner and whose second port is connectable to a display device on a subsequent stage in the daisy chain manner;
a storage unit that stores addresses of display devices connected to the second port as transmission sources in response to a request to search for display devices as targets for determining display device IDs thereof, the request being transmitted from the control computer to the display devices, where the addresses are transmitted from the individual display devices on subsequent stages and received by the network unit; and
a control unit that receives a total number which is the total number of the display devices and transmitted from the control computer, where the control unit determines the display device ID to be assigned to its own display device according to the received total number and the number of the addresses stored in the storage unit.

Another mode of the present invention is a multi-display system in which a plurality of display devices are connected via a network to a control computer in a daisy chain manner, wherein:
the control computer comprises:
a first transmission unit that transmits to the display devices, a request to search for display devices as targets for determining display device IDs thereof
a computation unit that computes the total number of the display devices according to the number of responses transmitted from the display devices in response to the request, and
a second transmission unit that transmits the computed total number to the display devices;
a first display device among the display devices comprises:
a first network unit whose first port is connectable to a control computer and whose second port is connectable to a display device on a subsequent stage,
a first storage unit that stores addresses of display devices connected to the second port as transmission sources, where the addresses are transmitted, in response to the request transmitted from the control computer, from the individual display devices on subsequent stages and received by the first network unit, and
a control unit that receives the total number transmitted from the control computer and determines the display device ID to be assigned to its own device according to the received total number and the number of the addresses stored in the first storage unit; and
an n-th display device among the display devices which is connected to a subsequent stage of the first display device, n being a natural number of 2 or greater, comprises:
a second network unit whose second port is connectable to a display device on a prior stage and whose third port is connectable to a display device on a subsequent stage,
a second storage unit that stores addresses of display devices connected to the third port as transmission sources, where the addresses are transmitted, in response to the request transmitted from the control computer, from the individual display devices on subsequent stages and received by the second network unit, and
a control unit that receives the total number transmitted from the control computer and determines the display device ID to be assigned to its own device according to the received total number and the number of the addresses stored in the second storage unit.

Another mode of the present invention is an ID determination method for display devices comprising:
receiving and storing addresses of display devices as transmission sources connected to subsequent stages of an own display device in a daisy chain manner in response to a request to search for display devices as targets for determining display device IDs thereof which is transmitted from a control computer to the individual display devices connected to the control computer in the daisy chain manner, and receiving a total number which is the total number of the display devices and transmitted from the control computer, where the control unit determines the display device ID to be assigned to the own display device according to the received total number and the number of the stored addresses.

Effect of the Invention

According to the present invention, it is possible to reduce an increase in time required to determine display IDs.

MODE FOR CARRYING OUT THE INVENTION

Below, embodiments of the present invention will be explained.

Figure 1:
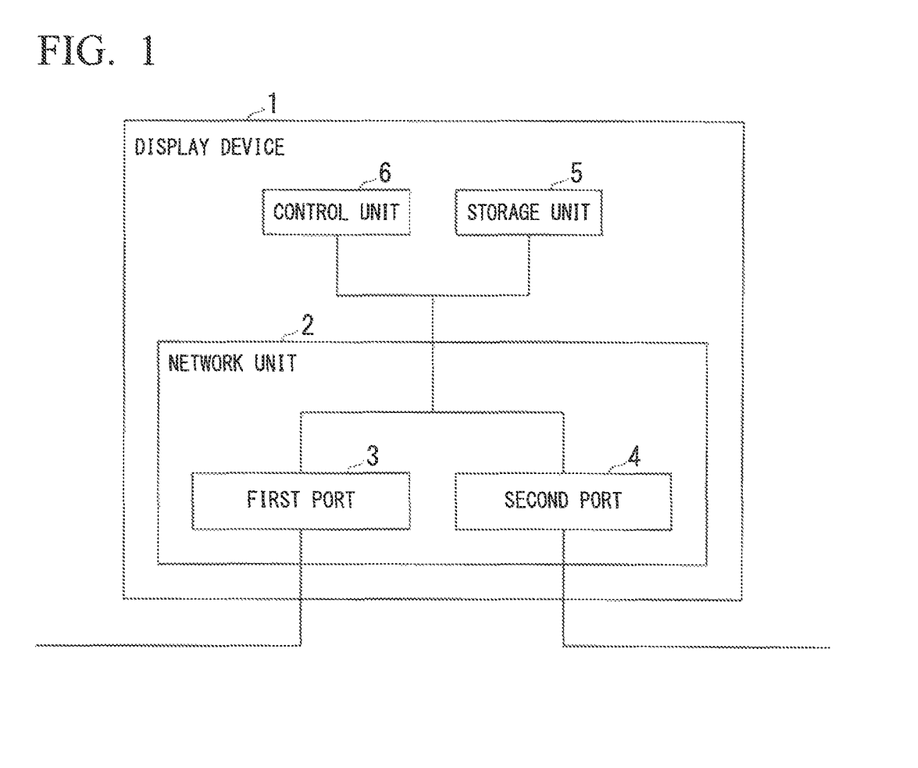
FIG. 1 is a general block diagram to show functions of a display device in a first embodiment.

FIG. 1 is a general block diagram to show functions of a display device in a first embodiment.

In a network unit 2 of the display device 1, a first port 3 is able to connect with a control computer (for performing control) or a display device on the prior stage in a daisy chain manner, and a second port 4 is able to connect with a display device on the subsequent stage in the daisy chain manner.

When a request of searching for a plurality of target display devices for determination of "display device IDs" is sent from the control computer, a storage unit 5 receives (using the network unit 2) and stores addresses of the display devices (as transmission sources) transmitted from the individual display devices on the subsequent stages, which are connected via the second port 4.

A control unit 6 receives a "total number", which is the total number of the plurality of the display devices and is transmitted from the control computer, and determines the display device ID assigned to the own device according to the received total number and the number of the addresses stored in the storage unit 5.

Next, a second embodiment will be explained.

Figure 2:
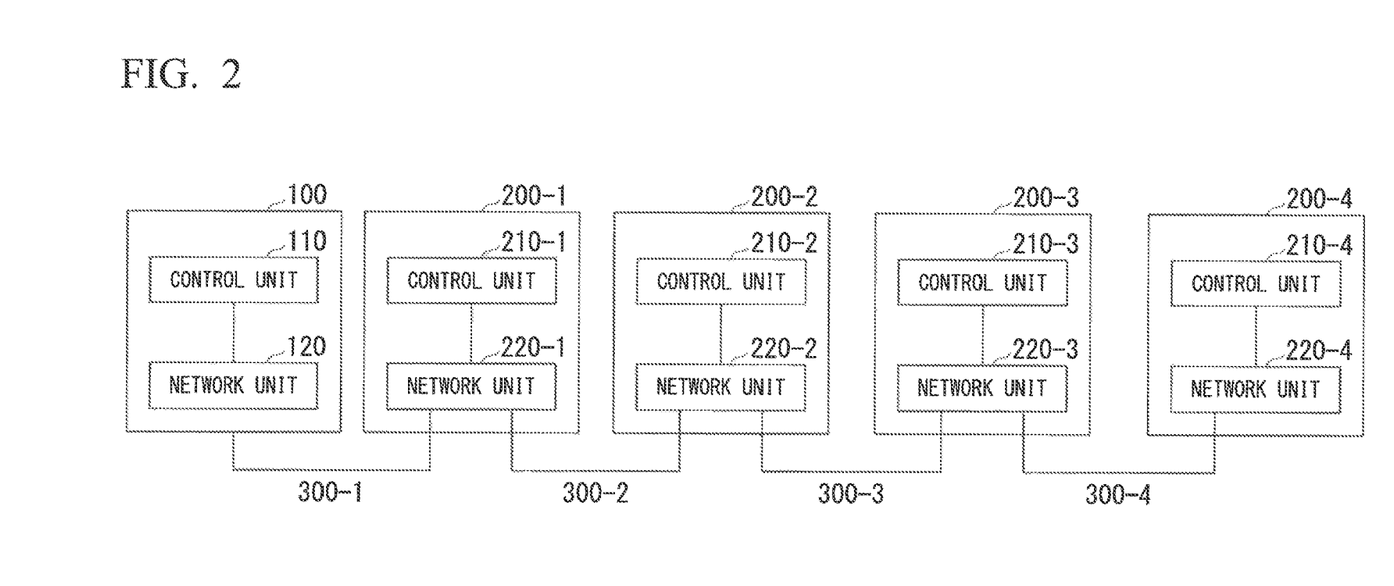
FIG. 2 is a general block diagram to show a configuration of a multi-display system in the second embodiment.

FIG. 2 is a general block diagram to show a configuration of a multi-display system in the second embodiment. A control computer 100 are connected to a plurality of display devices in a daisy chain manner. That is, the multi-display system is implemented by connecting the plurality of display devices via networks to the control computer in the daisy chain manner. For such a daisy chain connection, the Ethernet (registered trademark) may be utilized.

Here, four display devices 200-1, 200-2, 200-3, and 200-4 are connected in the daisy chain manner as the plurality of the display devices. However, the number of the connected display devices (plurality is essential) may be any number other than four. In addition, the display devices 200-1, 200-2, 200-3, and 200-4 may each be simply called a "display device 200".

The control computer 100 is connected to the display device 200-1 via a network cable 300-1.

A control unit 110 totally controls the control computer 100. The control unit 110 computes the total number of the display devices according to the number of responses transmitted from the display devices in response to a search request.

A network unit 120 has a function of communicating with the individual display devices connected to the subsequent stages; a function of transmitting a search request, which is utilized to search for display devices as targets for determining the display device ID, to the display devices; and a function of transmitting the computed total number to the display devices.

The display device 200-1 is connected via a network 300-2 to the display device 200-2 on the subsequent stage. The display device 200-1 has a control unit 210-1 and a network unit 220-1 and displays various videos on its own screen. The control unit 210-1 totally controls the display device 200-1. The network unit 220-1 communicates with other devices connected to the own device in the daisy chain manner so as to communicate various information items.

The display device 200-2 is connected via a network 300-3 to the display device 200-3 on the subsequent stage. The display device 200-2 has a control unit 210-2 and a network unit 220-2 and displays various videos on its own screen. The control unit 210-2 totally controls the display device 200-2. The network unit 220-2 communicates with other devices connected to the own device in the daisy chain manner so as to communicate various information items.

The display device 200-3 is connected via a network 300-4 to the display device 200-4 on the subsequent stage. The display device 200-3 has a control unit 210-3 and a network unit 220-3 and displays various videos on its own screen. The control unit 210-3 totally controls the display device 200-3. The network unit 220-3 communicates with other devices connected to the own device in the daisy chain manner so as to communicate various information items.

The display device 200-4 has a control unit 210-4 and a network unit 220-4 and displays various videos on its own screen. The control unit 210-4 totally controls the display device 200-4. The network unit 220-4 communicates with another device connected to the own device in the daisy chain manner so as to communicate various information items. Although a display device on the subsequent stage can be connected to the network unit 220-4, it is not connected in the present embodiment.

Figure 3:
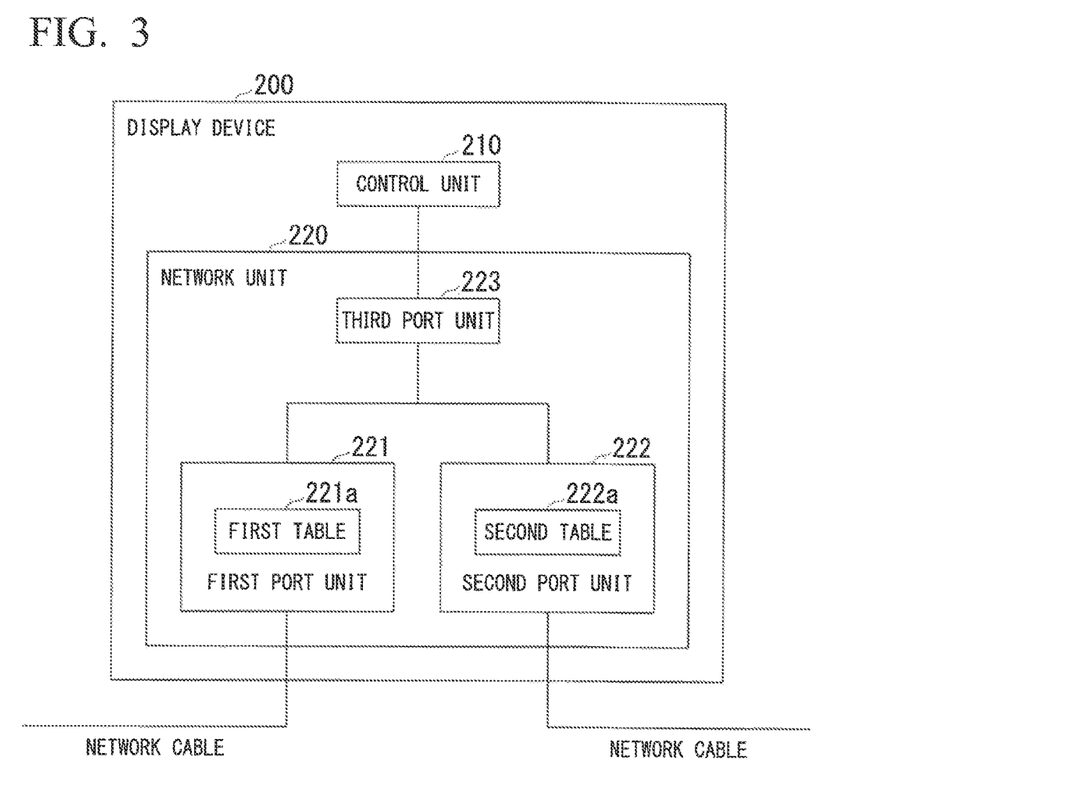
FIG. 3 is a general block diagram to show the functions of a display device 200 in the second embodiment.

FIG. 3 is a general block diagram to show the functions of the display device 200 in the second embodiment. The functions of the display device 200 in FIG. 3 are identical to the functions of each of the display devices 200-1, 200-2, 200-3, and 200-4.

In FIG. 3, the display device 200 has a control unit 210 and a network unit 220. The control unit 210 totally controls the display device 200.

The network unit 220 can be connected to the control computer 100 or other display devices 200 and is connected to the control unit 210. The network unit 220 may be implemented using a Layer 2 switch.

In a first port unit 221, its first port can be connected to the control computer 100 or another display device 200. The first port unit 221 has a first table 221a utilized to store an address (e.g., MAC address of the control computer 100) received from the first port.

In a second port unit 222, its second port can be connected to a display device on the subsequent stage. The second port unit 222 has a second table 222a utilized to store addresses of display devices (as transmission sources) on the subsequent stages, where the addresses are transmitted in response to a request from the control computer 100.

The control unit 210 receives the total number transmitted from the control computer 100 and determines the display device ID assigned to its own display device according to the received total number and the number of addresses stored in the second table 222a.

The control unit 210 transmits the determined display device ID via the first port to the control computer.

Next, the operation of the multi-display system in the second embodiment will be explained.

Figure 4:
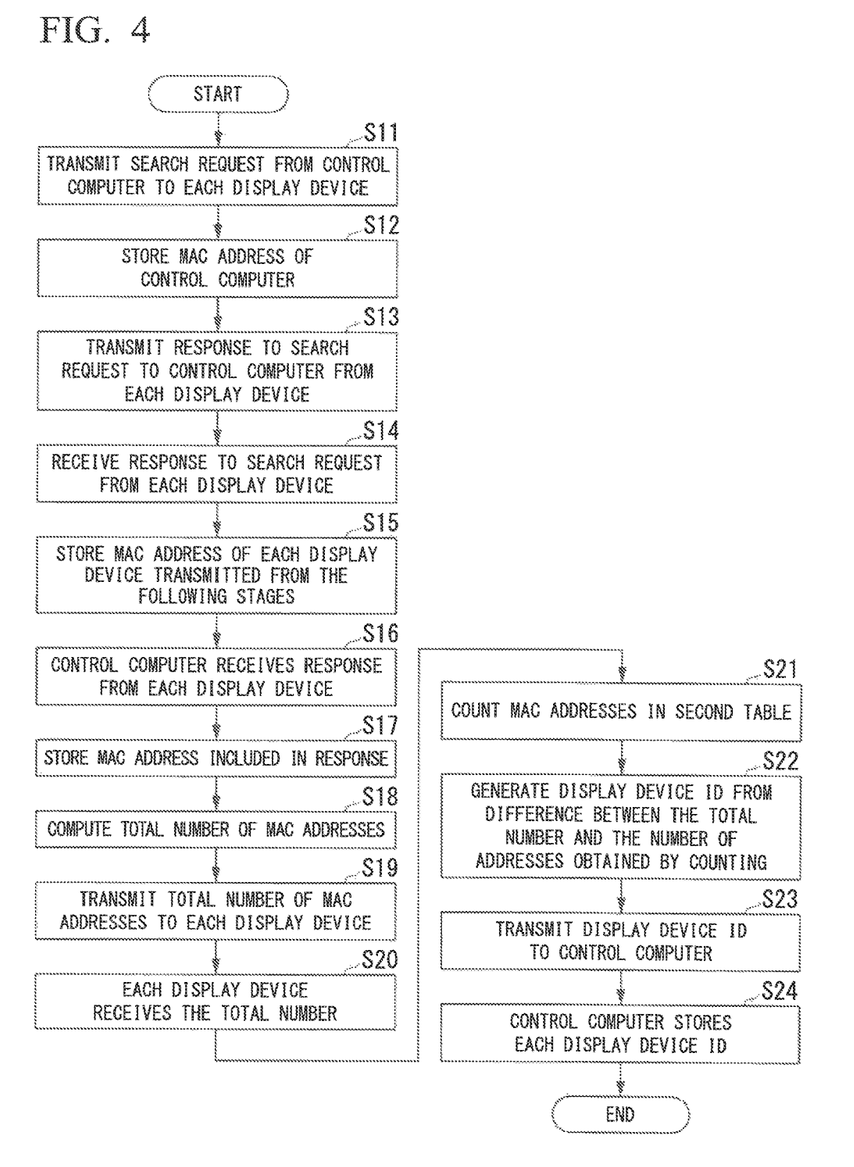
FIG. 4 is a flowchart showing the operation of the multi-display system.

FIG. 4 is a flowchart showing the operation of the multi-display system.

FIGS. 5, 6, 7, 8, and 9 are schematic diagrams utilized to explain the operation of the multi-display system.

Figure 5:
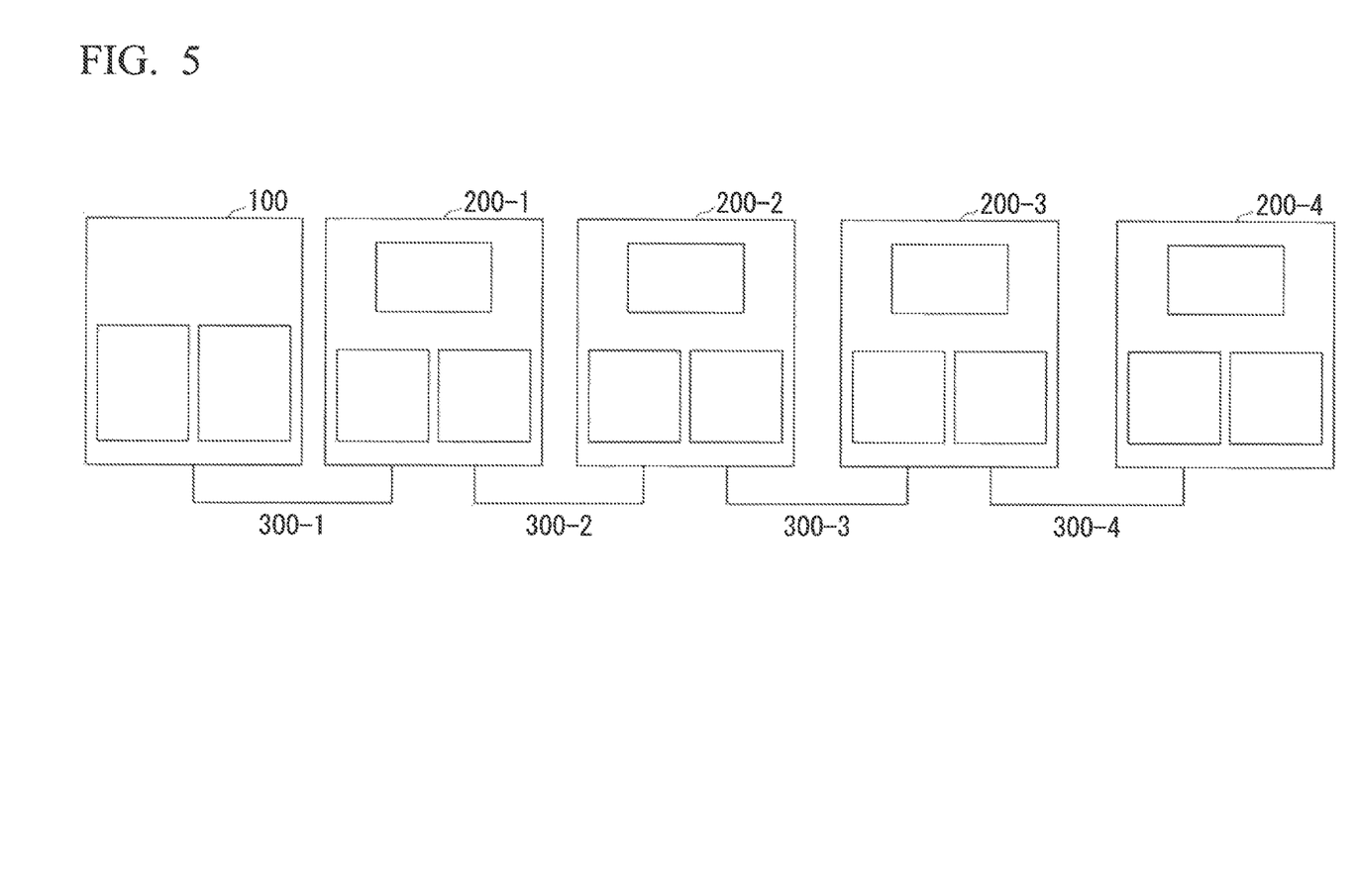
FIG. 5 is a schematic diagram utilized to explain the operation of the multi-display system.
Figure 6:
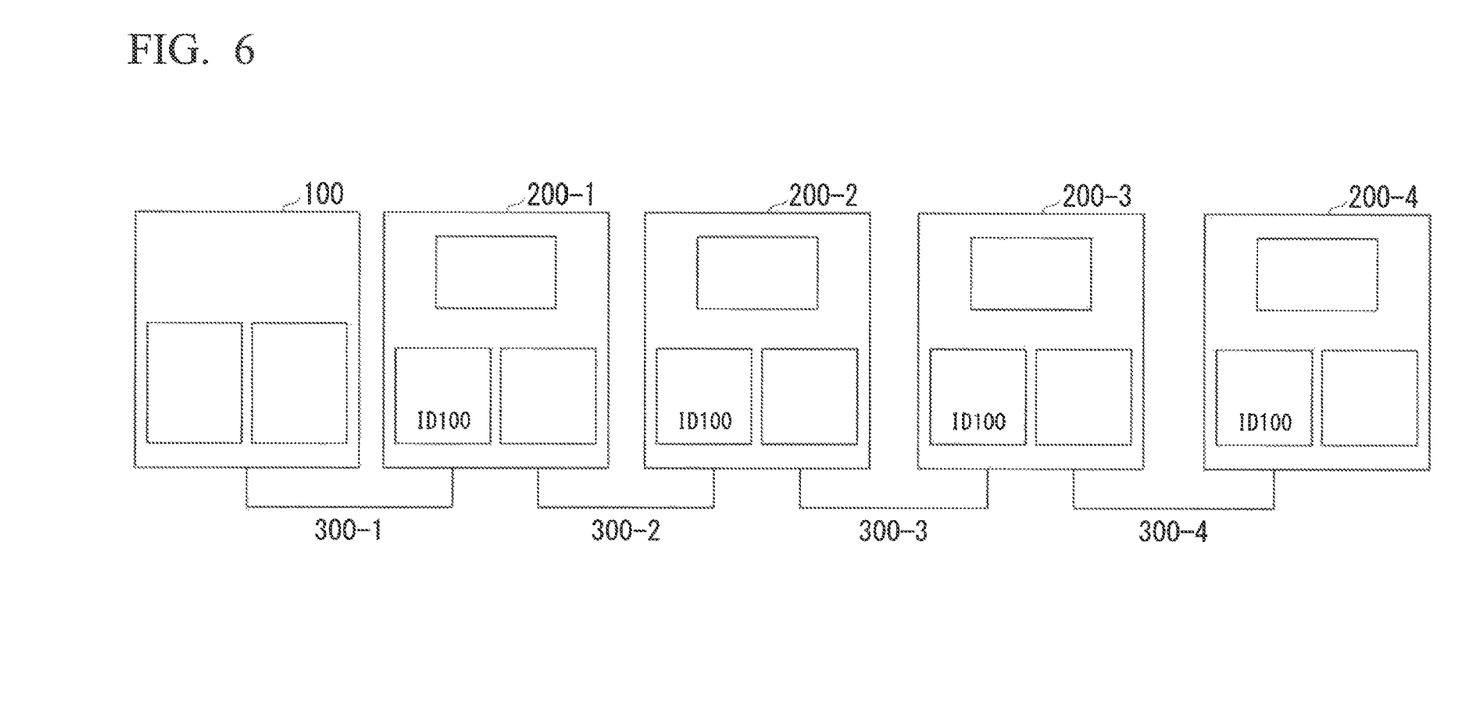
FIG. 6 is a schematic diagram utilized to explain the operation of the multi-display system.

Before the process of determining the display device ID is executed, no MAC address is stored in the first table and the second table of the individual display devices 200 (see FIG. 5).

First, the control unit 110 of the control computer 100 determines the individual display devices connected in the daisy chain manner to be target display devices for determining the display device ID and transmits a search request packet, which is utilized to search for each target display device, from the network unit 120 by means of broadcasting (see step S11). The search request packet includes the MAC address of the control computer 100.

The relevant search request transmitted by broadcasting is transmitted from the network unit 120 to the first port unit of the display device 200-1, then from the second port unit of the display device 200-1 to the first port unit of the display device 200-2, then from the second port unit of the display device 200-2 to the first port unit of the display device 200-3, and then from the second port unit of the display device 200-3 to the first port unit of the display device 200-4. In this process, the MAC address of the control computer 100 is stored in the first table of the first port unit of each display device (see step S12 and FIG. 6).

When each display device 200 receives the search request from the control computer 100, the display device 200 transmits a response to the control computer 100 (see step S13). The response includes a MAC address of the display device 200 (i.e., MAC address assigned to the own display device) which transmits the response.

Here, the response transmitted from the display device 200-4 is transmitted via the display devices 200-3, 200-2, and 200-1 to the control computer 100. The response transmitted from the display device 200-3 is transmitted via the display devices 200-2 and 200-1 to the control computer 100. The response transmitted from the display device 200-2 is transmitted via the display device 200-1 to the control computer 100. The response transmitted from the display device 200-1 is transmitted to the control computer 100.

Each display device 200 receives the response to the search request from each display device connected via the second port unit of the own display device 200 (see step S14). Then each display device 200 stores the MAC address of each display device, from which the response has been received, in the second table (see step S15 and FIG. 7).

Figure 7:
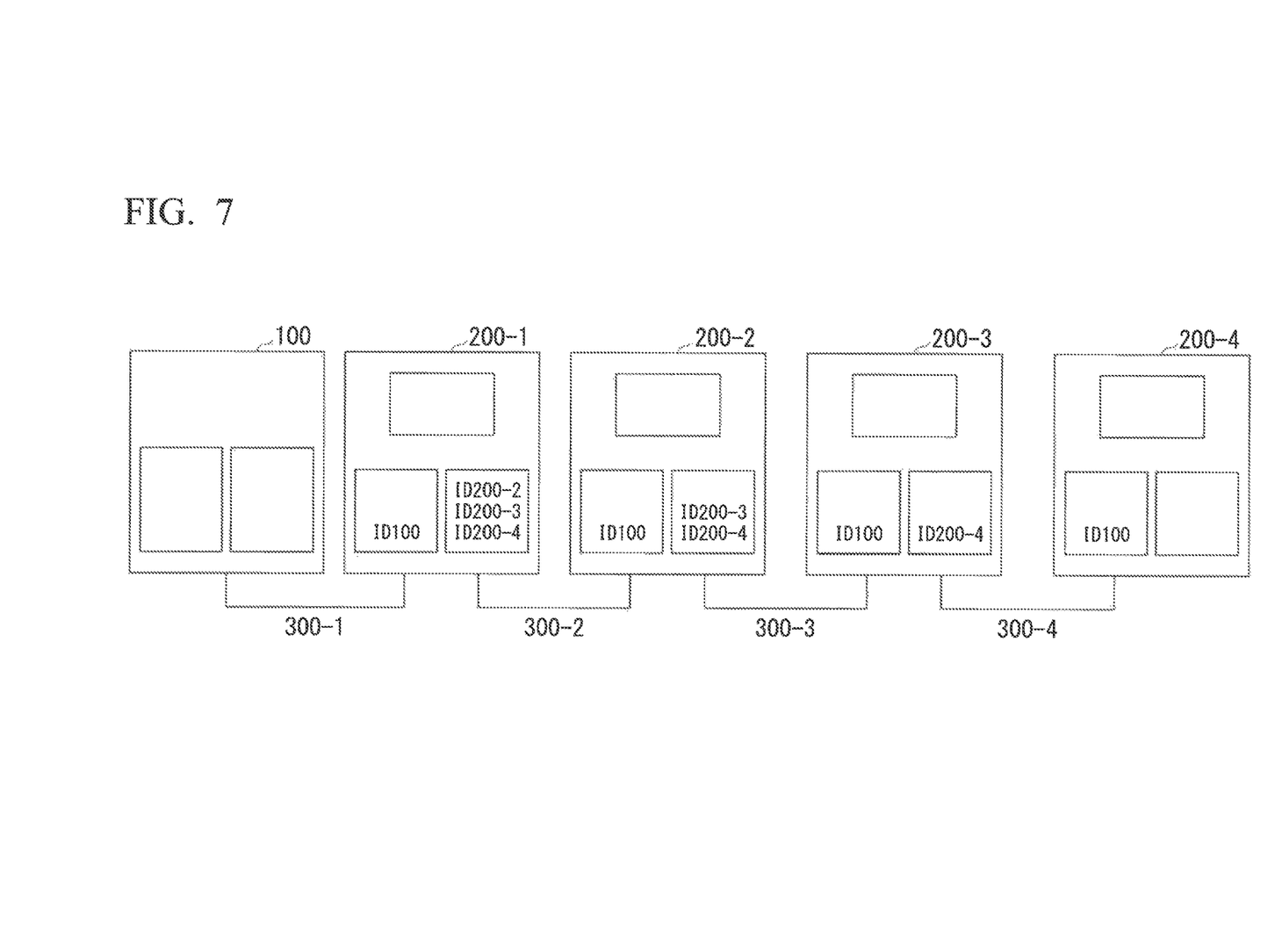
FIG. 7 is a schematic diagram utilized to explain the operation of the multi-display system.

For example, the display device 200-1 stores the MAC address of the display device 200-2, the MAC address of the display device 200-3, and the MAC address of the display device 200-4 in the second table. The display device 200-2 stores the MAC address of the display device 200-3 and the MAC address of the display device 200-4 in the second table. The display device 200-3 stores the MAC address of the display device 200-4 in the second table.

Figure 8:
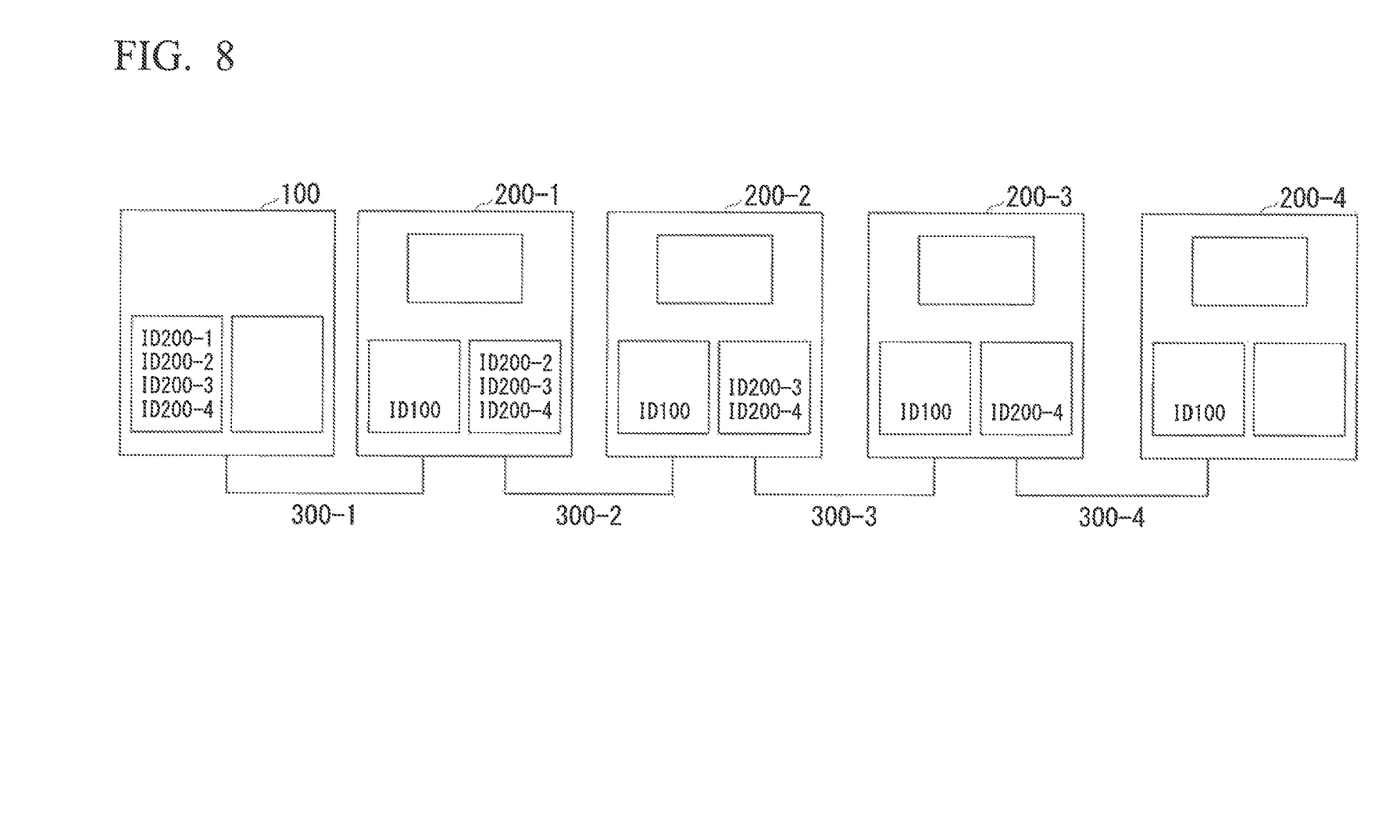
FIG. 8 is a schematic diagram utilized to explain the operation of the multi-display system.
Figure 9:
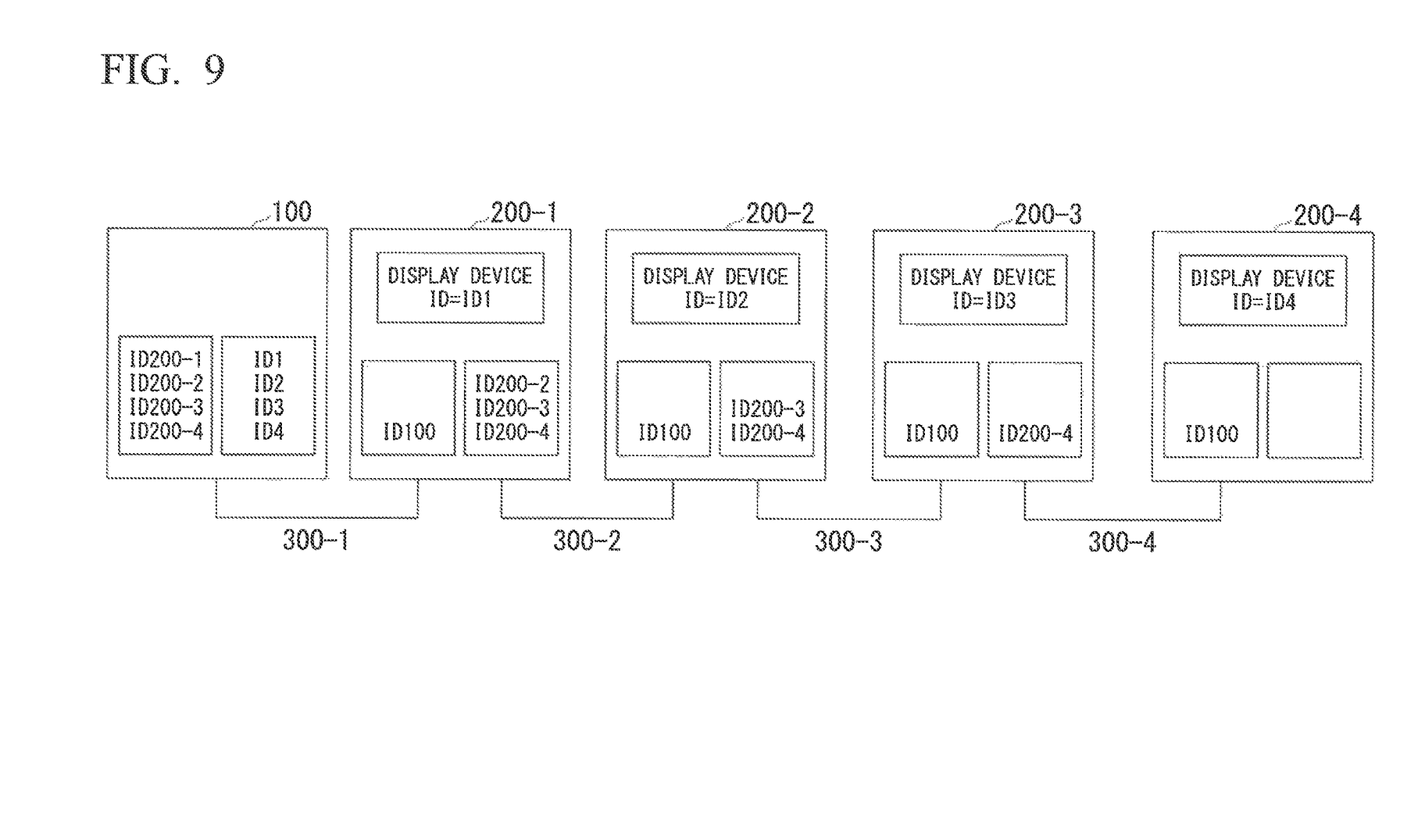
FIG. 9 is a schematic diagram utilized to explain the operation of the multi-display system.

The control unit 110 of the control computer 100 receives the response transmitted from each display device 200 via the network unit 120 (see step S16) and stores the MAC address of said each display device 200 in an internal memory of the control unit 110 (see step S17 and FIG. 8). The control unit 110 then counts the MAC addresses of the display devices 200 stored in the memory so as to compute the total number of the MAC addresses (see step S18) and transmits an ID determination packet, which includes the computed total number as information, to each display device 200 by means of broadcasting (see step S19).

When the control unit 210 of each display device 200 receives the ID determination packet (see step S20), the control unit 210 determines which of the first and second tables does not store the MAC address of the control computer 100, and obtains a determination result which indicates the second table. The control unit 210 of each display device 200 then counts the MAC addresses stored in the second table (see step S21) and computes the difference between the above total number and the number of addresses obtained by the counting. According to the obtained difference, the control unit 210 generates the display device ID (see step S22). The generated display device ID is stored in an internal memory of the own control unit 210 (see FIG. 9).

When the display device ID is generated, the control unit 210 transmits this display device ID via the network unit 220 to the control computer 100 (see step S23). The control computer 100 stores the display device ID transmitted from each display device 200 (see step S24).

In accordance with the above-explained first and second embodiments, a MAC address learning function of the Layer 2 switch employed for the connection is utilized to forcibly make the Layer 2 switch learn the MAC address. According to the result of the learning, the MAC addresses of the display devices on the subsequent stages are counted, and difference between the computed number of addresses and the total number of the display devices is computed. Therefore, it is possible to implement a high-speed automatic display ID determination method which does not depend on connection ports.

In addition, since the Ethernet (registered trademark) does not define the connection ports such as one for the prior stage and one for the subsequent stage, it is possible to perform the ID determination which does not depend on the location of an RJ45 connector utilized in the Ethernet (registered trademark). Furthermore, the individual display devices simultaneously count the number of MAC addresses in parallel, that is, they do not perform the counting sequentially. Therefore, high-speed processing is possible even when the number of the display devices increases.

In the above-described first and second embodiments, the display device ID is computed according to the total number of the display devices and the number of the MAC addresses stored in the second port. In this case, instead of utilizing the difference between the total number and the number of the MAC addresses, the sum of the total number and the number of the MAC addresses may be utilized. Here, any operation may be employed if different display device IDs can be generated according to the total number and the number of the MAC addresses.

In addition, a program used to implement the function of the display device 200 in FIG. 1 may be stored in a computer readable storage medium, and the program stored in the storage medium may be loaded and executed on a computer system, so as to execute the process of determining the display device ID. Here, the computer system includes hardware resources such as an OS, peripheral devices, and the like.

If the computer system employs a WWW system, the computer system can provide a homepage service (or a viewable) environment.

The above computer readable storage medium is a storage device, for example, a portable medium such as a flexible disk, a magneto optical disk, a ROM, or a CD-ROM, or a hard disk built in a computer system. The computer readable storage medium also includes a device for temporarily storing the program, such as a volatile storage medium in a computer system which functions as a server or client. In addition, the program may execute a part of the above-explained function. In addition, the program may also be a program by which the above-described function can be executed by a combination program of the relevant program and an existing program which has already been stored in the computer system. Furthermore, the program may be stored in a specific server in advance and be delivered via a communication network (by means of downloading or the like) in response to a request from another apparatus.

While embodiments of the present invention have been described with reference to the drawings, specific structures are not limited to the embodiments. Modifications in design or the like can be made without departing from the scope of the present invention.

REFERENCE SYMBOLS 1, 200, 200-1, 200-2, 200-3, 200-4 Display device
2 network unit
3 first port
4 second port
5, 110, 210-1, 210-2, 210-3, 210-4 storage unit
6, 110, 210, 210-1, 210-2, 210-3, 210-4 control unit
12
100 control computer
120, 220, 220-1, 220-2, 220-3, 220-4 network unit
221 first port unit
221a first table
222 second port unit
222a second table
223 third port

The invention claimed is:

1. A display device, comprising:
a network unit including a first port that is connectable to a control computer or a display device on a prior stage in a daisy chain manner and a second port that is connectable to a display device on a subsequent stage in the daisy chain manner; and
a storage unit that stores addresses of display devices, as transmission sources, transmitted from one or each of the display devices at subsequent stages of a daisy chain connected via the second port in response to a request to search for a plurality of display devices as targets for determining display device IDs thereof, the plurality of display devices being connected to the control computer in the daisy chain manner, the request being transmitted from the control computer to the plurality of display devices, where the addresses are received by the network unit.

2. The display device in accordance with claim 1, wherein the stored addresses of the display devices are used for counting the display devices at the subsequent stages of an own display device of the daisy chain.

3. The display device in accordance with claim 1, wherein the stored addresses of display devices correspond to a number of the display devices at the subsequent stages of an own display device of the daisy chain.

4. The display device in accordance with claim 1, wherein a number of the stored addresses of display devices indicates a number of the display devices at the subsequent stages of an own display device of the daisy chain.

5. The display device in accordance with claim 1, wherein the network unit transmits an address of an own display device to the first port in response to the request.

6. The display device in accordance with claim 1, wherein the network unit uses a Layer 2 switch.

7. The display device in accordance with claim 1, wherein, in response to the transmission of the request, the control computer receives addresses of the plurality of display devices.

8. A multi-display system in which a plurality of display devices are connected via a network to a control computer in a daisy chain manner,
wherein the control computer comprises:
a transmission unit that transmits to the plurality of display devices, a request to search for the plurality of display devices as targets for determining display device IDs thereof,
wherein a first display device among the plurality of display devices comprises:
a first network unit including a first port that is connectable to a control computer and a second port that is connectable to a display device on a subsequent stage; and
a first storage unit that stores addresses of display devices, as transmission sources, transmitted from one or each of display devices at subsequent stages of a daisy chain connected via the second port in response to the request, where the addresses are received by the first network unit,
wherein an n-th display device among the plurality of display devices which is connected to a subsequent stage of the first display device, n being a natural number of 2 or greater, comprises:
a second network unit including a second port that is connectable to a display device on a prior stage and a third port that is connectable to a display device on a subsequent stage; and
a second storage unit that stores addresses of display devices as transmission sources, transmitted from one or each of the display devices at the subsequent stages of the daisy chain connected via the third port in response to the request, where the addresses are received by the second network unit.

9. The multi-display system in accordance with claim 8, wherein the stored addresses of the display devices are used for counting the display devices at the subsequent stages of an own display device of the daisy chain.

10. The multi-display system in accordance with claim 8, wherein the stored addresses of display devices correspond to a number of the display devices at the subsequent stages of an own display device of the daisy chain.

11. The multi-display system in accordance with claim 8, wherein the first network unit transmits an address of an own display device to the first port in response to the request, and wherein the second network unit transmits an address of the own display device to the second port in response to the request.

12. The multi-display system in accordance with claim 8, wherein the first network unit and the second network unit use a Layer 2 switch.

13. The multi-display system in accordance with claim 8, wherein, in response to the transmission of the request, the control computer receives addresses of the plurality of display devices.

14. A management method for display devices, the management method comprising:
    receiving addresses of display devices, as transmission sources, transmitted from one or each of the display devices at subsequent stages of an own display device of a daisy chain in response to a request to search for a plurality of display devices as targets for determining display device IDs thereof, the request being transmitted from a control computer to the plurality of display devices connected to the control computer in the daisy chain manner; and
    storing the addresses of display devices.

15. The management method in accordance with claim 14, wherein the stored addresses of the display devices are used for counting the display devices at the subsequent stages of the own display device of the daisy chain.

16. The management method in accordance with claim 14, wherein the stored addresses of display devices correspond to a number of the display devices at the subsequent stages of the own display device of the daisy chain.

17. The management method in accordance with claim 14, wherein a number of the stored addresses of display devices indicates a number of the display devices at the subsequent stages of the own display device of the daisy chain.

18. The management method in accordance with claim 14, further comprising transmitting an address of the own display device in response to the request.

19. The management method in accordance with claim 14, wherein the receiving uses a Layer 2 switch.

20. The management method in accordance with claim 14, wherein, in response to the transmission of the request, addresses of the plurality of display devices are received by the control computer.

* * * * *